US012205505B1

(12) United States Patent
Davis et al.

(10) Patent No.: US 12,205,505 B1
(45) Date of Patent: Jan. 21, 2025

(54) COILED WEARABLE RECONFIGURABLE SCREEN

(71) Applicant: MOTOROLA MOBILITY LLC, Wilmington, DE (US)

(72) Inventors: Giles T Davis, Downers Grove, IL (US); Keith J Pump, Chicago, IL (US); Thomas Gitzinger, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/354,015

(22) Filed: Jul. 18, 2023

(51) Int. Cl.
*G09G 3/00* (2006.01)
*G06F 1/16* (2006.01)
*G06F 3/0488* (2022.01)

(52) U.S. Cl.
CPC ............ *G09G 3/035* (2020.08); *G06F 1/163* (2013.01); *G06F 1/1652* (2013.01); *G09G 3/03* (2020.08); *G06F 3/0488* (2013.01); *G06F 2203/04102* (2013.01); *G09G 2340/0407* (2013.01); *G09G 2354/00* (2013.01); *G09G 2380/02* (2013.01)

(58) Field of Classification Search
CPC .. G09G 3/03; G09G 3/035; G09G 2340/0407; G09G 2354/00; G09G 2380/02; G06F 1/163; G06F 1/1652; G06F 3/0488; G06F 2203/04102

USPC .......................................... 345/156, 1.3, 3.4
See application file for complete search history.

(56) References Cited

U.S. PATENT DOCUMENTS

| 2012/0007796 A1* | 1/2012 | Jokinen | G06F 1/1652 |
| | | | 361/749 |
| 2015/0154936 A1* | 6/2015 | Lee | G06F 3/0416 |
| | | | 345/1.3 |
| 2016/0282899 A1* | 9/2016 | Inagaki | A44C 5/0053 |
| 2016/0306393 A1* | 10/2016 | Huitema | G06F 1/1643 |

* cited by examiner

*Primary Examiner* — Jason M Mandeville
(74) *Attorney, Agent, or Firm* — Isidore PLLC

(57) ABSTRACT

An electronic device, method, and computer program product provide a flexible display that is configurable when being worn around a wrist of a user to increase a display width area. The electronic device includes a strap having an outer layer presenting the flexible display and an inner support layer attached to an underside of the flexible display. The strap is positionable between an uncoiled position and the coiled position with lateral edges of first and second terminal ends of the strap juxtaposed in abutted alignment. In response to determining the coiled position based on a sensor or a user interface input, a display driver of the electronic device selectively renders display content and presents rendered display content within a coil display area that is two straps wide of terminal ends of the strap in juxtaposed adjacent position.

20 Claims, 15 Drawing Sheets

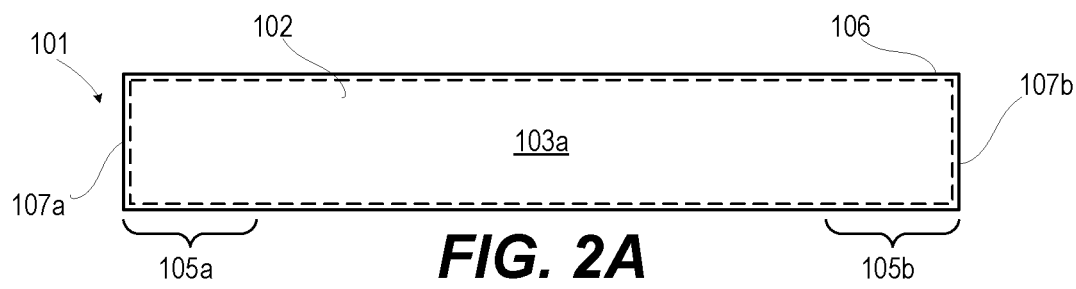
FIG. 2A
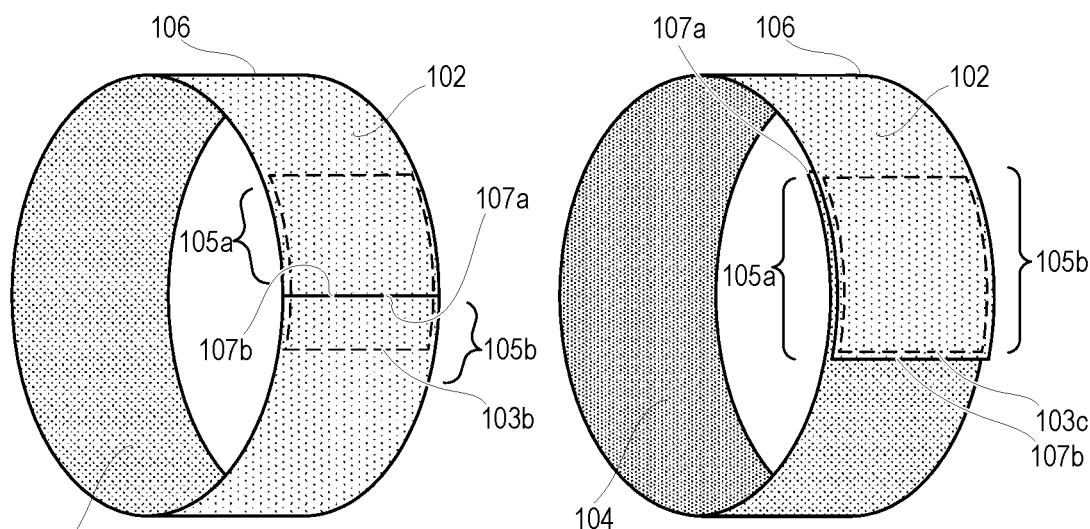
FIG. 2B  FIG. 2C
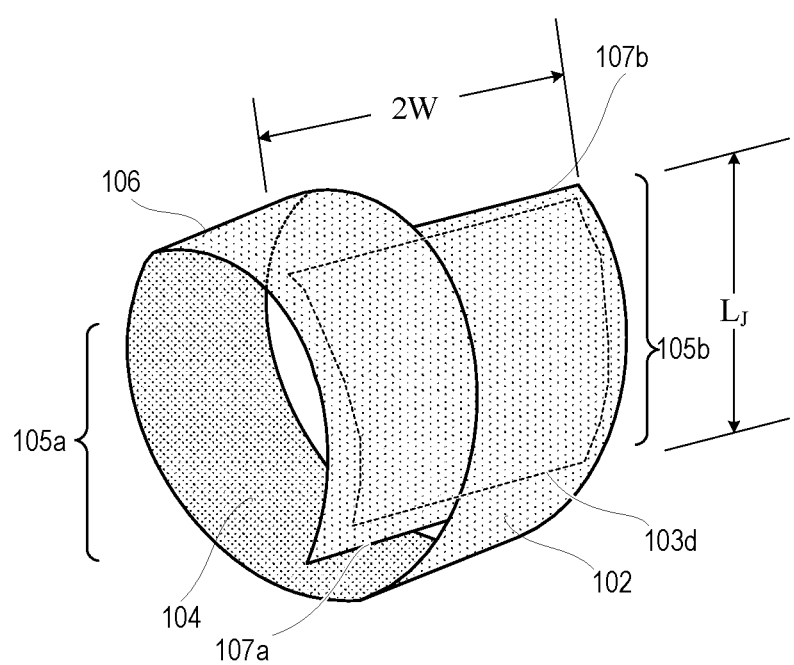
FIG. 2D

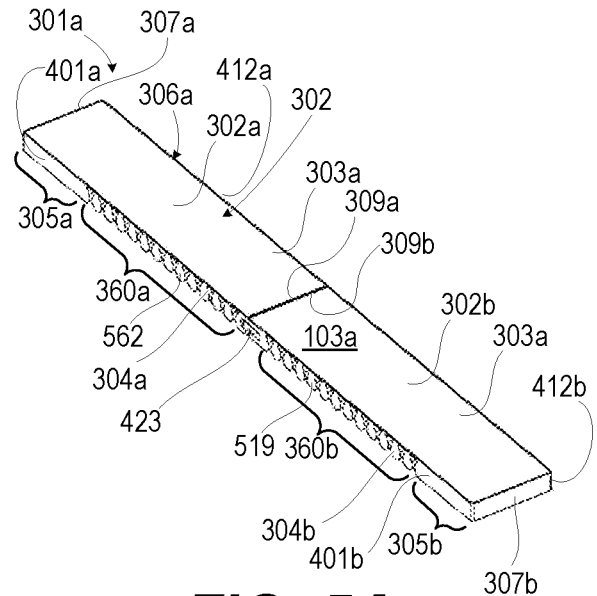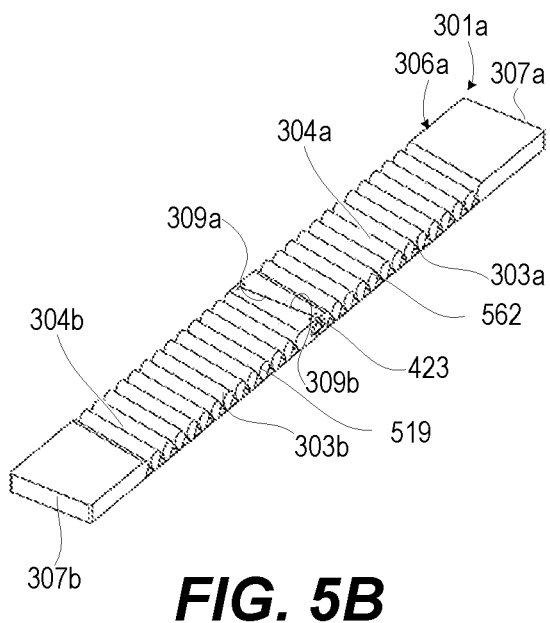
FIG. 5A  FIG. 5B
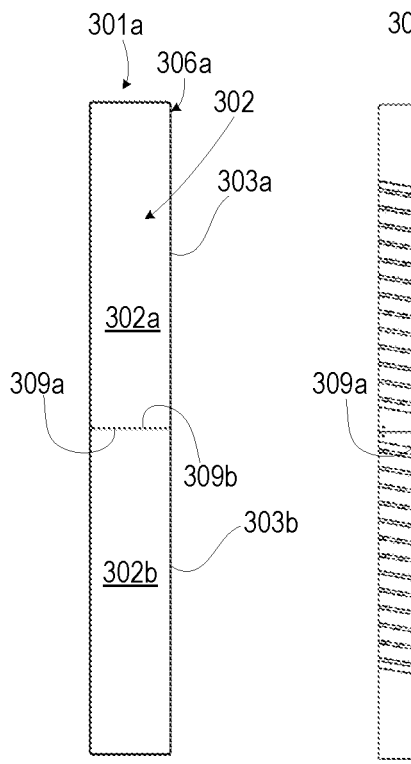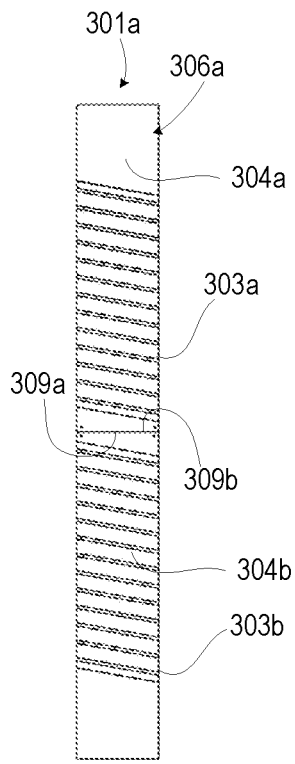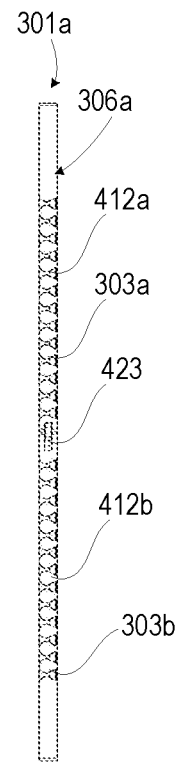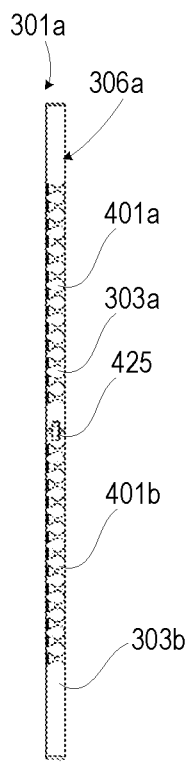
FIG. 5C  FIG. 5D  FIG. 5E  FIG. 5F

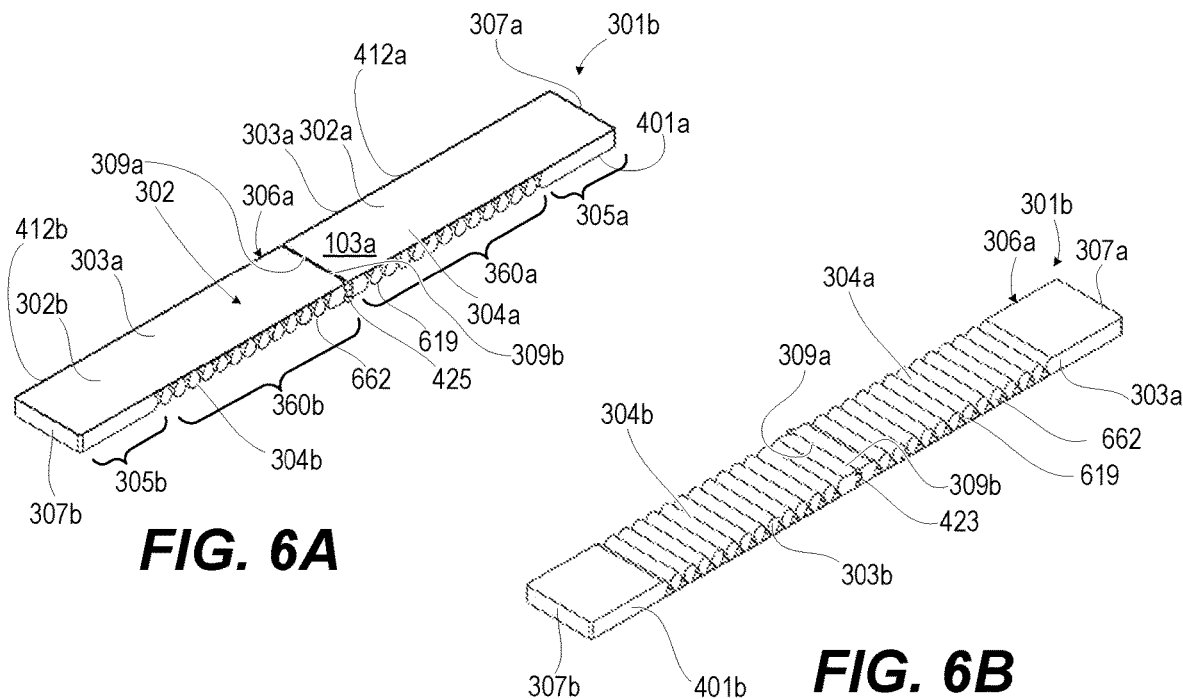
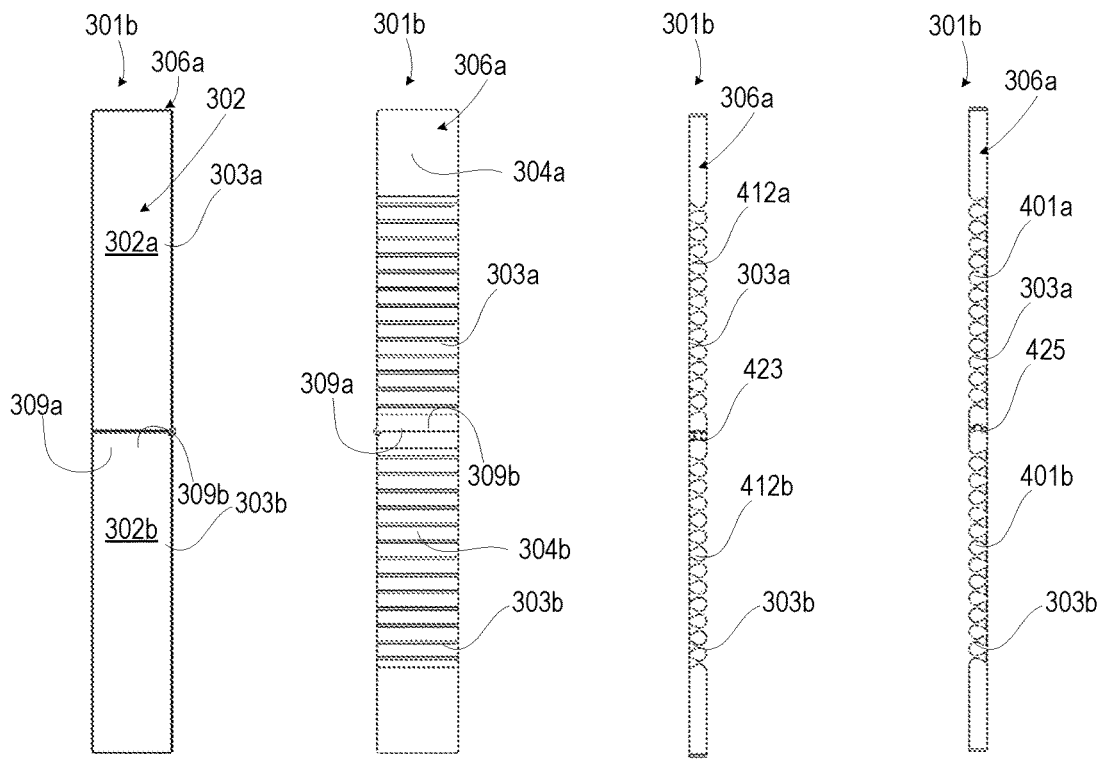
FIG. 6A  FIG. 6B
FIG. 6C   FIG. 6D   FIG. 6E   FIG. 6F

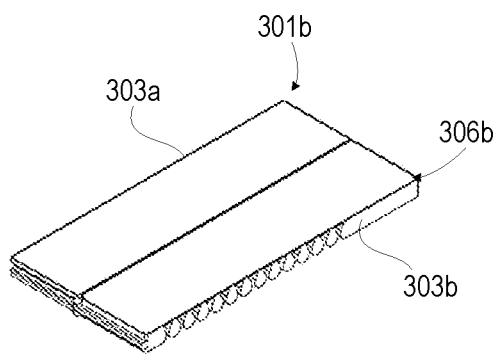
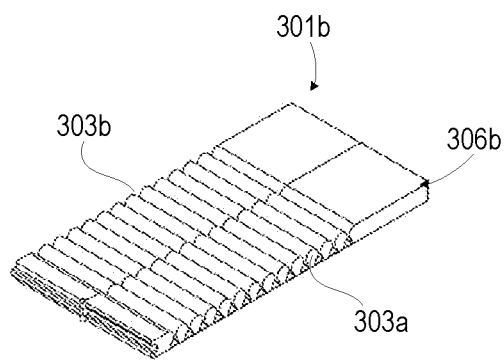
FIG. 7A  FIG. 7B
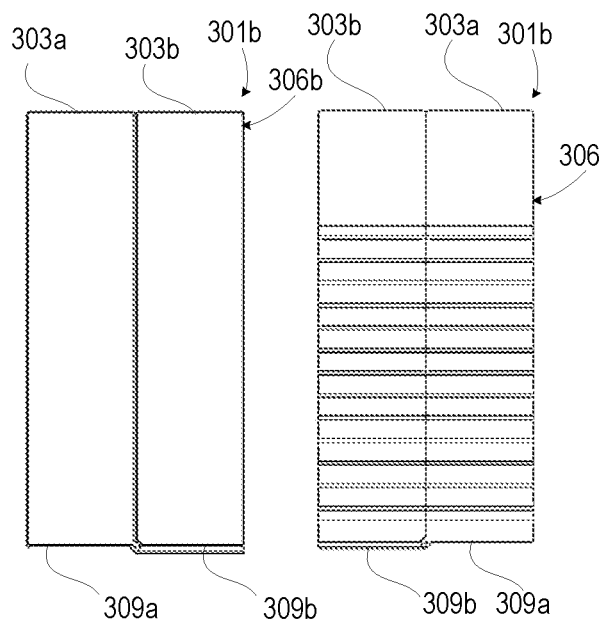
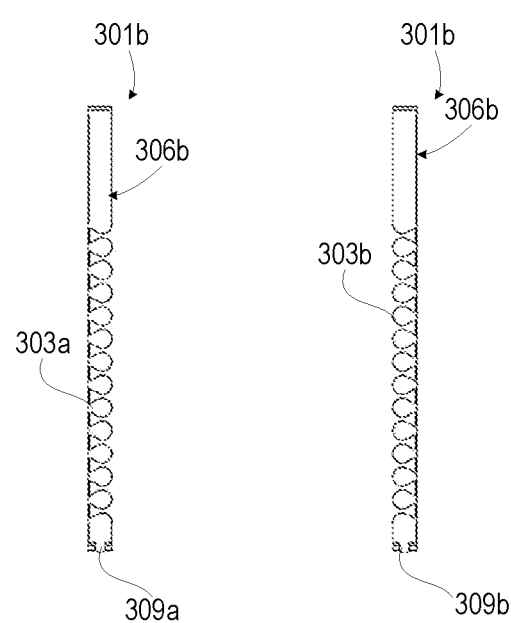
FIG. 7C  FIG. 7D  FIG. 7E  FIG. 7F

COILED WEARABLE RECONFIGURABLE SCREEN

BACKGROUND

1. Technical Field

The present disclosure relates generally to a flexible display, and in particular to flexible display configured to be operable when being worn by a user.

2. Description of the Related Art

For decades, displays of mobile electronic devices have been rigid and thus supported by a rigid part of the device. In an example, smart watches include rigid displays that are limited to a rigid face attached to flexible straps that do not include display components. Even when well supported, the rigid displays are vulnerable to damage due to impact. Generally, the size of the rigid displays has to be small, limiting the uses of small wearable displays to small amounts of data and control. For presenting video and image data, users prefer larger devices such as smartphones, tablets and laptops. However, these devices with larger displays are not as portable as wearable devices such as smart watches.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A is a front view of the electronic device of FIG. 1 having a strap in a flat position presenting a full-length display area, according to one or more embodiments;

FIG. 2B is a three-dimensional view of the electronic device of FIG. 1 having the strap in a looped terminal edges abutted position and presenting a box display area, according to one or more embodiments;

FIG. 2C is a three-dimensional view of the electronic device of FIG. 1 having the strap in a looped overlapping terminal ends position that presents a box display area, according to one or more embodiments;

FIG. 2D is a three-dimensional view of the electronic device of FIG. 1 having the strap coiled into a juxtaposed terminal ends position that presents a double width display area, according to one or more embodiments;

FIG. 5A depicts a top three-dimensional view of the example electronic device in the extended, flat position, according to one or more embodiments;

FIG. 5B depicts a bottom three-dimensional view of the example electronic device of FIG. 5A in the extended, flat position, according to one or more embodiments;

FIG. 5C depicts a top view of the example electronic device of FIG. 5A in the extended, flat position, according to one or more embodiments;

FIG. 5D depicts a bottom view of the example electronic device of FIG. 5A in the extended, flat position, according to one or more embodiments;

FIG. 5E depicts a left-side view of the example electronic device of FIG. 5A in the extended, flat position, according to one or more embodiments;

FIG. 5F depicts a right-side view of the example electronic device of FIG. 5A in the extended, flat position, according to one or more embodiments;

FIG. 6A depicts a top three-dimensional view of an example electronic device of FIG. 3 in an extended, flat position, according to one or more embodiments;

FIG. 6B depicts a bottom three-dimensional view of the electronic device of FIG. 6A in the extended, flat position, according to one or more embodiments;

FIG. 6C depicts a top view of the electronic device of FIG. 6A in the extended, flat position, according to one or more embodiments;

FIG. 6D depicts a bottom view of the electronic device of FIG. 6A in the extended, flat position, according to one or more embodiments;

FIG. 6E depicts a left-side view of the electronic device of FIG. 6A in the extended, flat position, according to one or more embodiments;

FIG. 6F depicts a right-side view of the electronic device of FIG. 6A in the extended, flat position, according to one or more embodiments;

FIG. 7A depicts a top three-dimensional view of the electronic device of FIG. 6A with first and second half straps pivoted to a full-length juxtaposed parallel position to present a pivoted display area of one-half strap length by two strap width, according to one or more embodiments;

FIG. 7B depicts a bottom three-dimensional view of the electronic device of FIG. 7A in the full-length juxtaposed parallel position, according to one or more embodiments;

FIG. 7C depicts a top view of the electronic device of FIG. 7A, according to one or more embodiments;

FIG. 7D depicts a bottom view of the electronic device of FIG. 7A in the full-length juxtaposed parallel position, according to one or more embodiments;

FIG. 7E depicts a left-side view of the electronic device of FIG. 7A in the full-length juxtaposed parallel position, according to one or more embodiments;

FIG. 7F depicts a right-side view of the electronic device of FIG. 7A in the full-length juxtaposed parallel position, according to one or more embodiments;

DETAILED DESCRIPTION

Figure 1:
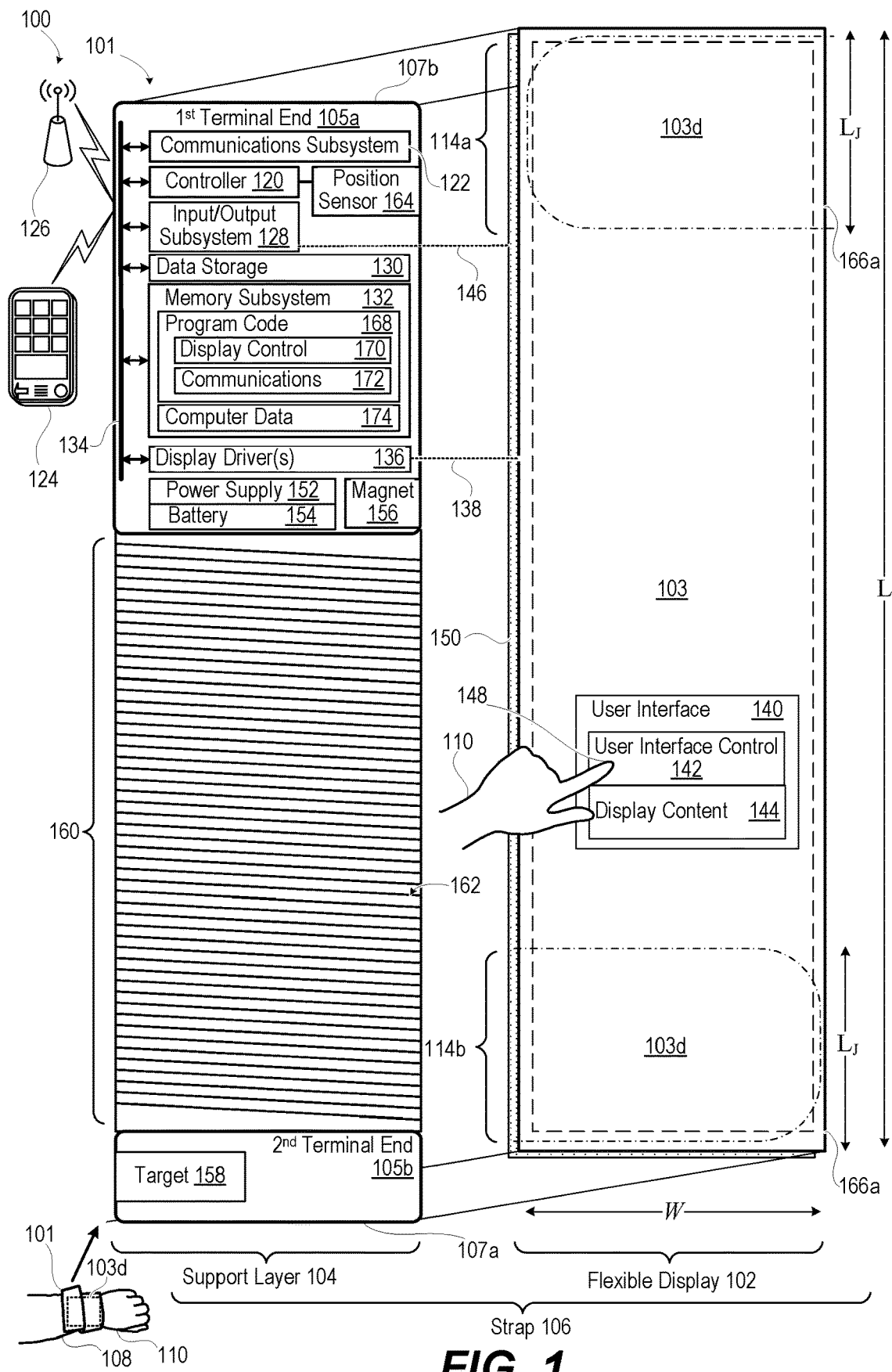
FIG. 1 presents a simplified functional block diagram of an electronic device having a flexible display incorporated into a single wrist-wearable strap, according to one or more embodiments.

According to aspects of the present disclosure, an electronic device, method, and computer program product provide a flexible display that is configurable when being worn around a wrist of a user to increase a display width area. In one or more embodiments, the electronic device includes a strap elongated in a longitudinal length dimension relative to a lateral width dimension. The strap includes an outer layer presenting the flexible display and an inner support layer attached to an underside of the flexible display. The strap is configured to be positionable between an uncoiled position and a coiled position with lateral edges of first and second terminal ends of the strap juxtaposed in abutted alignment. In one or more embodiments, at least a middle portion of the inner support layer includes a series of nonorthogonal transverse channels that are parallel to each other and that resist twisting. The series of nonorthogonal transverse channels enable at least one portion of the strap to coil in a plane not aligned with the longitudinal length dimension of the strap in the uncoiled position. The plane of coiling of the strap enables juxtaposed abutting alignment between lateral edges of the first and the second terminal ends in the coiled position. While in the coiled position, the electronic device is configured to be worn on a wrist of a user. The electronic device includes at least one display engine that is communicatively coupled to the flexible display. In response to determining the coiled position of the strap with juxtaposed lateral edges of the first and the second terminal ends, the at least one display engine is configured to selectively render and present display content within a coil display area of up to an abutted length of the juxtaposed lateral edges by two straps width.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 2E:
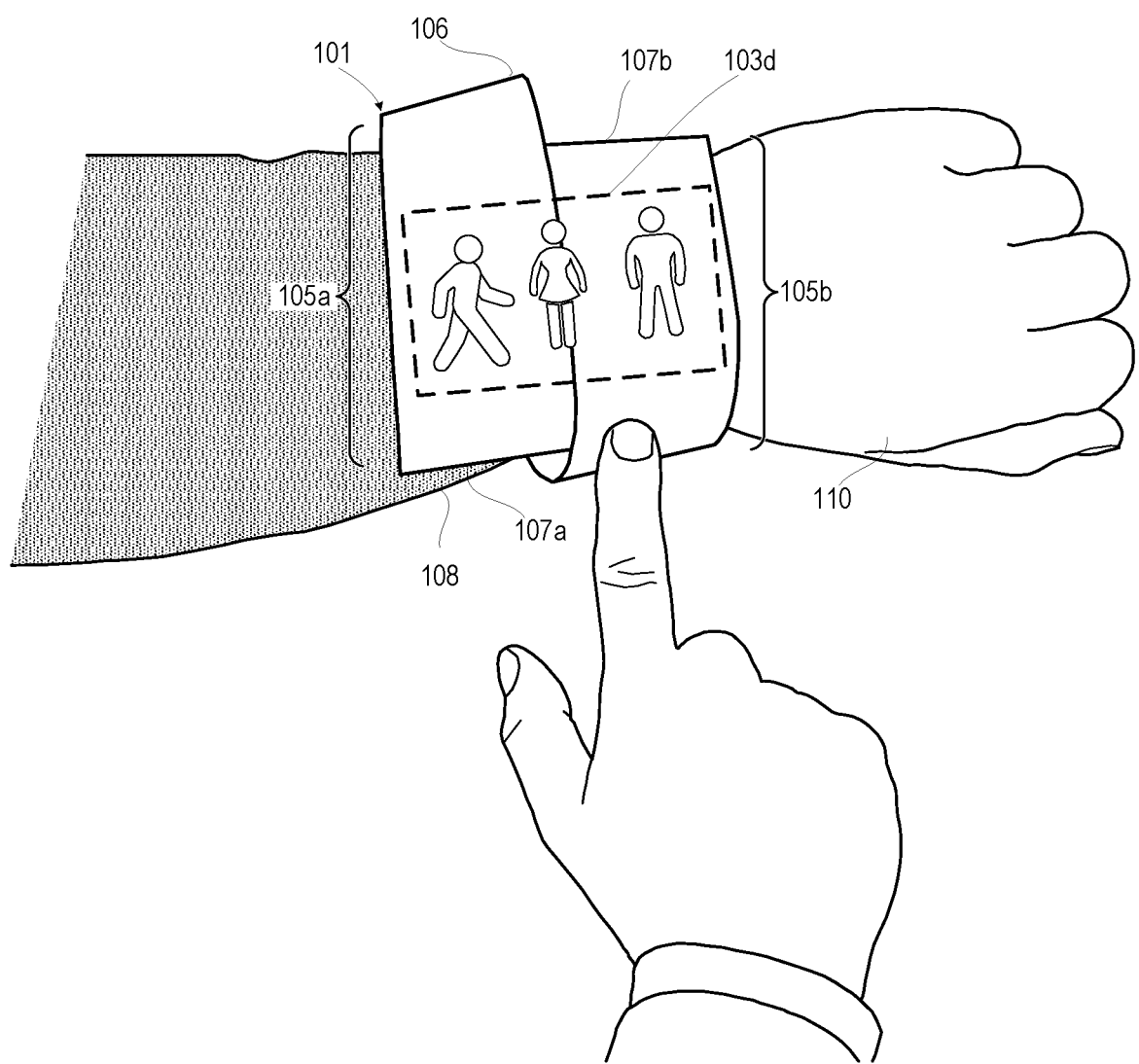
FIG. 2E depicts a three-dimensional view of the electronic device of FIG. 2D worn on a wrist of a user, according to one or more embodiments.

FIG. 1 presents a simplified functional block diagram of electronic device 101 having flexible display 102 having one or more display area 103 and attached to inner support layer 104 to form strap 106 having first and second terminal ends 105a-105b with corresponding terminal edges 107a-107b, and in which the features of the present disclosure are advantageously implemented. FIG. 2A depicts a front view of electronic device 101 in a flat position, presenting full-length display area 103a. Each of the embodiments depicted herein may be positioned in the flat position. Given the narrow aspect ratio, digital content may be presented on only a portion of full-length display area 103a. Strap 106 is bendable into a curved shape in which flexible display 102 may be activated to display visual content. FIG. 2B depicts a three-dimensional view of strap 106 in a terminal edges abutted loop position that is configured to be worn on a wrist. With full-length display area 103a curved into a band, not all of flexible display 102 is viewable from one vantage point and may not be necessarily used. In an example, box display area 103b is presented by flexible display 102 as limited by a width of strap 106 and by a resulting aspect ratio to support user interfaces, images, or video content viewing from one vantage point. Similarly, FIG. 2C depicts a three-dimensional view of strap 106 in an overlapped terminal ends loop position that is configured to be worn on a wrist. With full-length display area 103a curved into a band, not all of flexible display 102 is viewable from one vantage point. In addition, inner terminal end 105a is covered by outer terminal end 105b of strap 106. In an example, box display area 103c is presented by flexible display 102 as limited by a width of strap 106 and a length of the overlapping inner and outer terminal ends 105a-105b. FIG. 2D is a three-dimensional view of electronic device 101 having strap 106 coiled into a position with juxtaposed terminal ends 105a-105b that presents double width display area 103d. In FIGS. 2A-2E and 4A-4C, strap 106 is capable of being flat, being looped, or being coiled. In one or more embodiments, inner support layer 104 constrains strap 106 constrains bending movement to only one of coiling or looping and not both. Straps that are configured to only coil or lay flat are depicted in FIGS. 1 and 5A-5G and described below. Straps that are configured to only loop or lay flat are depicted in FIGS. 3, 6A-6H and 7A-7F and described below. In addition to coiling and/or looping, embodiments according to the present disclosure may also provide a strap that is formed by a pair of corner pivoting half straps. When pivoted to a parallel juxtaposition in a flat position, the flexible display presents a half length by double width display area 103e, as depicted in FIGS. 4C, 7A, and 7C and described below. For clarity, the present disclosure presents embodiments that coil in one direction and pivot in one direction. Features of the strap may be reversed or mirrored to coil and pivot in another direction.

Returning to FIG. 1, flexible display 102 may essentially consist of, or include a visual output layer such as an organic light emitting diode (OLED) substrate that is bendable. First and second terminal ends 105a-105b of support layer 104 of strap 106 having length "Li" may engage in a coiled position that is a side-by-side, juxtaposed position. While in the coiled position, corresponding first and second portions 114a-114b of flexible display 102 are in a juxtaposed and adjacent position to provide coil display area 103d that is a double width (2W) size compared to the width of a single portion of the strap. Flexible display 102 provides full-length display area 103a that is a length "L" and width "W" of strap 106 while in an uncoiled position in which first and second terminal ends 105a-105b of support layer 104 are opposed to each other and corresponding first and second portions 114a-114b of flexible display 102 are not in juxtaposed, adjacent alignment.

In one or more embodiments, electronic device 101 includes controller 120 that is communicatively coupled via communications subsystem 122 to communication device 124 as part of communication environment 100 for data communications with external nodes 126. In one or more embodiments, electronic device 101 is implemented to incorporate functionality of communication device 124. One or both of electronic device 101 and communication device 124 may incorporate additional optional features, such as wireless communication. Electronic device 101 and communication device 124 individually or in combination can be one of a host of different types of devices of device systems, including but not limited to, a mobile cellular phone, satellite phone, or smart phone, a laptop, a netbook, an ultrabook, a networked smartwatch or networked sports/exercise watch, and/or a tablet computing device or similar device that can include wireless communication functionality. As device(s) supporting wireless communication, electronic device 101 and communication device 124 individually or in combination can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

With continued reference to FIG. 1, in addition to controller 120 and communications subsystem 122, electronic device 101 include input/output (I/O) subsystem 128, data storage subsystem 130, and memory subsystem 132. Controller 120 may include a processor subsystem, which includes one or more central processing units (CPUs) such as a data processor. The processor subsystem can include one or more digital signal processors that can be integrated with data processor. Controller 120 manages, and in some instances directly controls, the various functions and/or operations of electronic device 101. These functions and/or operations include, but are not limited to including, application data processing, communication with second communication devices, navigation tasks, image processing, and signal processing. In one or more alternate embodiments, electronic device 101 may use hardware component equivalents for application data processing and signal processing. For example, electronic device 101 may use special purpose hardware, dedicated processors, general purpose computers, microprocessor-based computers, micro-controllers, optical computers, analog computers, dedicated processors and/or dedicated hard-wired logic.

To enable management by controller 120, system interlink 134 communicatively connects controller 120 with communications subsystem 122, I/O subsystem 128, data storage subsystem 130, and memory subsystem 132. System interlink 134 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 134) are illustrated in FIG. 1, it is to be understood that more, fewer, or different interconnections may be present in other embodiments.

According to aspects of the present disclosure, controller 120 of electronic device 101 directs display driver(s) 136 to provide, via visual data connection 138, user interface 140 including user interface controls 142 and display content 144 to flexible display 102. Controller 120 may receive, via I/O subsystem 128 and touch data connection 146, touch inputs 148 from user 110 that are detected by touch input layer 150 of flexible display 102. Portable power supply 152 and battery 154 provide power to components of electronic device 101. Electronic device 101 includes a coil retention mechanism, such as a permanent magnet 156 on first terminal end 105a and an oppositely oriented permanent magnet or ferrous magnet target 158 in second terminal end 105b. Middle portion 160 of inner support layer 104 facilitates alignment of coil retention mechanism by having a series of nonorthogonal transverse channels 162. Nonorthogonal transverse channels 162 are parallel to each other and resist twisting while enabling at least one of the opposed terminal ends 105a-105b of strap 106 to coil in a plane not aligned with the longitudinal length dimension of strap 106 in the uncoiled position. The plane of coiling of strap enables juxtaposed abutting alignment between lateral edges of first and the second terminal ends 105a-105b in the coiled position. In the coiled position, electronic device 101 is configured to be worn on wrist 108 of user 110. Controller 120 monitors position sensor 164 that is configured to detect the coiled position with lateral edges 166a-166b of first and second terminal ends 105a-105b, respectively, of strap 106 in juxtaposed abutted alignment.

Memory subsystem 132 stores program code 168 such as display control application 170 that, when executed by controller 120, configures electronic device 101 to manage rendering and presenting display content 144 according to the coiled or uncoiled position of strap 106. Memory subsystem 132 stores program code 168 such as communication application 172 that, when executed by controller 120, configures electronic device 101 to communicate with communication device 124 and external node 126. Memory subsystem 132 stores computer data 174 such as user interface controls 142 and display content 144. Program code 168 may be software or firmware that, when executed by controller 120, configures electronic device 101 to manage display configurations. In one or more embodiments, program code 168 may be integrated into a distinct chipset or hardware module as firmware that operates separately from executable program code. Portions of program code 168 may be incorporated into different hardware components that operate in a distributed or collaborative manner. Program code 168 may be stored on a computer readable storage device that when executed by a processor associated with electronic device 101 provides functionality of the present disclosure described herein. Implementation of program code 168 may use any known mechanism or process for doing so using integrated hardware and/or software, as known by those skilled in the art. Program code 168 may access, use, generate, modify, store, or communicate computer data 174. Memory subsystem 132 may further include an operating system (OS), firmware interface, such as basic input/output system (BIOS) or Uniform Extensible Firmware Interface (UEFI), and firmware, which may be considered as program code 168.

Figure 3:
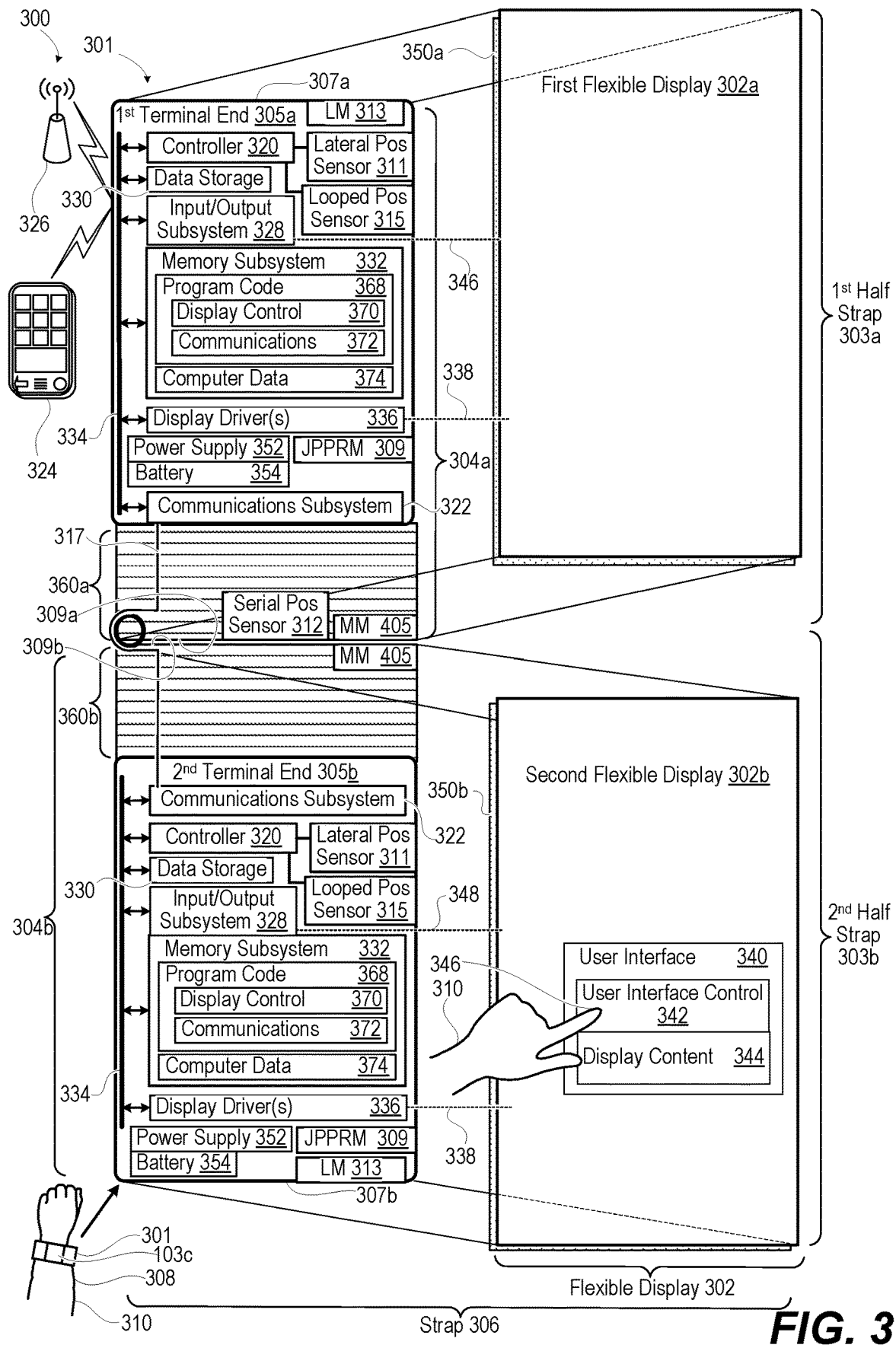
FIG. 3 presents a simplified functional block diagram of an electronic device, implemented as a communication device having a flexible display incorporated into a looping wrist-wearable strap, according to one or more embodiments.
Figure 4A:
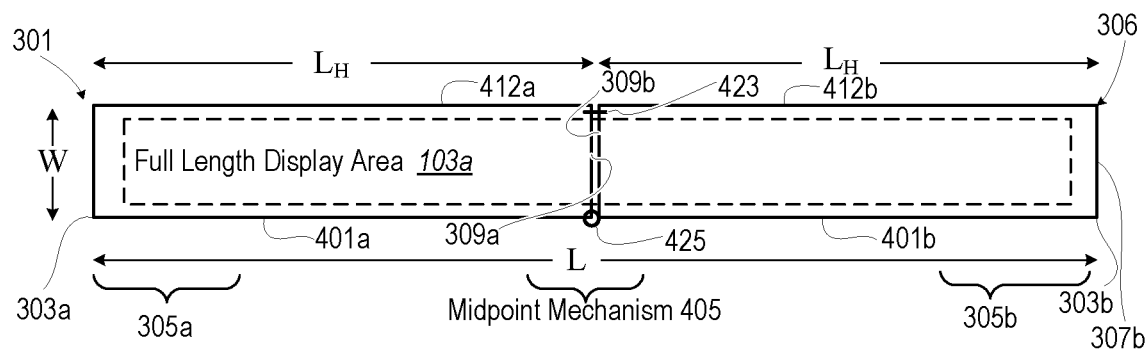
FIG. 4A depicts a top view of the example electronic device of FIG. 3 with first and second half straps in series alignment to present the full-length display area of up to the full strap length by the single strap width, according to one or more embodiments.
Figure 4B:
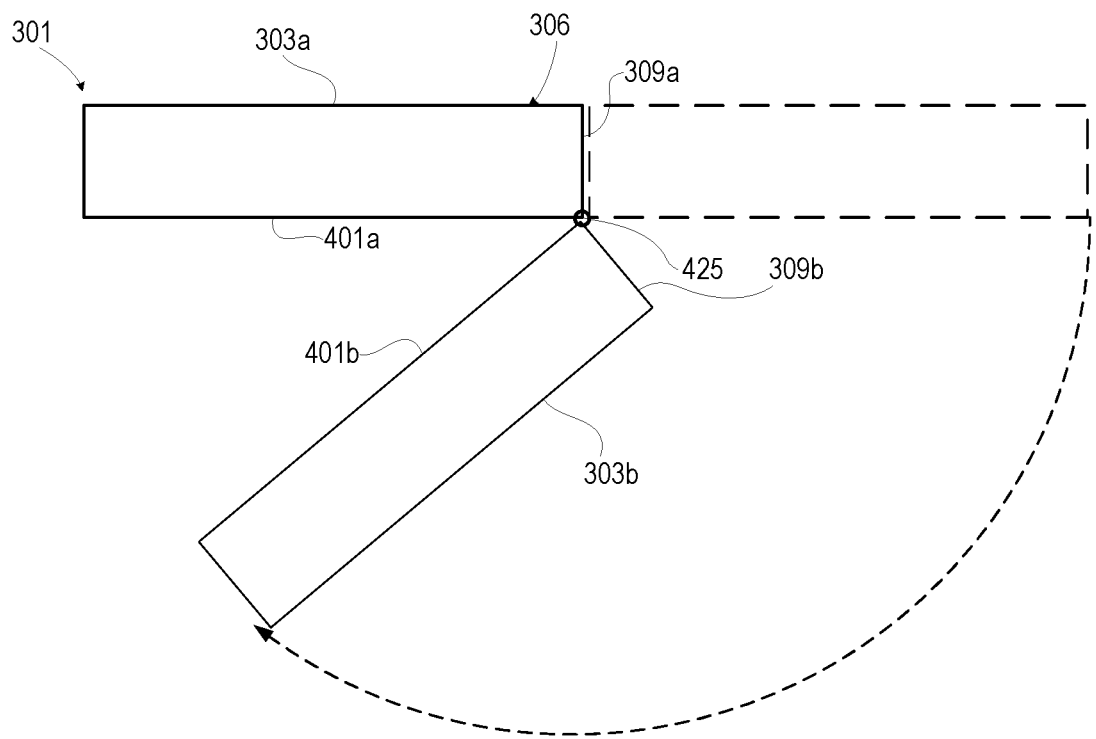
FIG. 4B depicts a top view of the example electronic device of FIG. 4A with first and second half straps pivoted to an intermediate position, according to one or more embodiments.
Figure 4C:
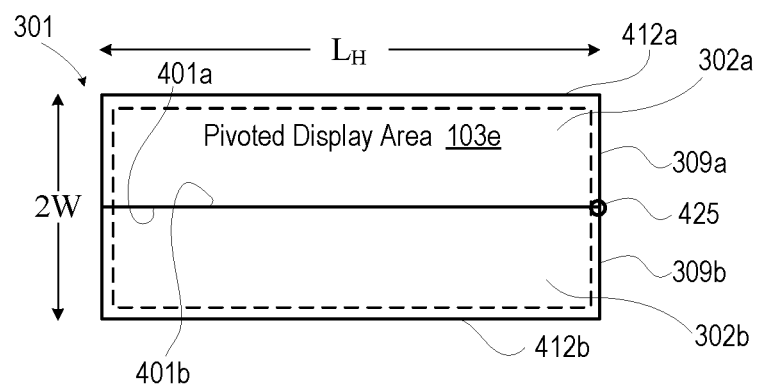
FIG. 4C depicts a top view of the example electronic device of FIG. 4A with a full length of first and second half straps in a juxtaposed parallel position, according to one or more embodiments.

FIG. 3 presents a simplified functional block diagram of electronic device 301 having flexible display 302 incorporated into a wrist-wearable strap 306 formed from first and second half straps 303a-303b having lateral internal ends 309a-309b that are serially connected and configured to pivot to provide full-length display area 103a (FIG. 4A) and pivoted display area 103e (FIG. 4C). First and second half straps 303a-303b have respective terminal ends 305a-305b with terminal edges 307a-307b. FIG. 4A depicts a top view of the example electronic device 301 of FIG. 3 with first and second half straps 303a-303b in series alignment to present full-length display area 103a of up to the full strap length by one strap width. Lateral internal ends 309a-309b, respectively, of first and second half straps 303a-303b are pivoted into close proximity and alignment. Pivot sides 401a-401b, respectively, of first and second half straps 303a-303b are in series alignment. Midpoint mechanism 405 is positioned between adjacent lateral internal ends 309a-309b of first and second half straps 303a-303b. Midpoint mechanism 405 includes latch 423 between nonpivoting sides 412a-412b, respectively, of first and second half straps 303a-303b that selectively engages first corresponding corners of pivot sides 401a-401b of the adjacent lateral internal ends 309a-309b. Midpoint mechanism 405 includes corner hinge 425 as a corner pivoting attachment between second corresponding corners of the adjacent lateral internal ends. The corner pivoting attachment enables pivoting between: (i) serial alignment of first and second half straps 303a-303b to engage the first corresponding corners via latch 423; and (ii) non-serial juxtaposed parallel alignment of first and second half straps 303a-303b.

FIG. 4B depicts a top view of electronic device 301 of FIG. 4A with first and second half straps 303a-303b pivoted to an intermediate position. FIG. 4C depicts a top view of electronic device 301 of FIG. 4A with of first and second half straps 303a-303b with pivot sides 401a-401b, respectively, of first and second half straps 303a-303b pivoting into a full juxtaposed parallel position. Lateral internal ends 309a-309b are brought into serial alignment laterally. Flexible display 302 is configured into pivoted display area 103e of one strap length by two strap width.

Returning to FIG. 3, strap 306 is configurable to provide one of: (i) full-length display area 103a (FIG. 4A) of up to one strap length by one strap width; (ii) pivoted display area 103e (FIG. 4C) of up to one strap length by two strap width; and (iii) loop box display area 103c (FIG. 2C), similar to a smart watch, of an outer one of overlapping terminal ends of strap 306 in a looped position wearable on wrist 308 of user 310. Midpoint mechanism 405 (depicted as "MM" in FIG. 3) maintains first and second half straps 303a-303b in serial alignment for full-length display area 103a (FIG. 4A), which serial alignment may be detected by serial position sensor 312. Juxtaposed parallel position mechanism 309 (depicted as "JPPM" in FIG. 3) maintains first and second half straps 303a-303b in juxtaposed parallel alignment for pivoted display area 103e (FIG. 4C), which parallel alignment may be detected by lateral position sensor 311. Looped mechanism 313 maintains first and second terminal ends 305a-305b, respectively, of first and second half straps 303a-303b in a looped position, either in 'end edge to end edge' contact or overlapping contact. Looped position sensor 315 detects the looped position of strap 306. In one or more embodiments, components of the same name depicted in FIG. 3 are similar or identical to the components described above with regard to FIG. 1.

In one or more embodiments, electronic device 301 may include functional components similar to electronic device 101 (FIG. 1), with the components essentially all positioned in one of first and second half straps 303a-303b and communicatively coupled via power/communication interconnect 317. In one or more embodiments, electronic device 301 includes duplication in each of first and second terminal ends 305a-305b of some or all of the functional components communicatively coupled via power/communication interconnect 317. Instead of coiled position sensor 164 (FIG. 1), electronic device 301 includes lateral position sensor 311 and looped position sensor 315.

First half strap 303a is elongated in a longitudinal length dimension relative to a lateral width dimension. First half strap 303a includes an outer layer presenting first flexible display 302a and first inner support layer 304a attached to an underside of first flexible display 302a. Second half strap 303b is elongated in the longitudinal length dimension relative to the lateral width dimension and includes a second outer layer presenting second flexible display 302b and second inner support layer 304b attached to an underside of second flexible display 302b.

In one or more embodiments, first terminal end 305a of electronic device 301 includes controller 320 that is communicatively coupled via communications subsystem 322 to communication device 324 as part of communication environment 300 for data communications with external nodes 326. In an example, controller 320 manages first flexible display 302a and first touch input layer 350a of first half strap 303a. Controller 320 may directly manage second flexible display 302b and second touch input layer 350b of second half strap 303b. Alternatively, controller 320 may indirectly manage second flexible display 302b and second touch input layer 350b via power/communication interconnect 317 and controller 320 or display driver 336 of second half strap 303b. In one or more embodiments, electronic device 301 is implemented to incorporate functionality of communication device 324. One or both of electronic device 301 and communication device 324 may incorporate additional optional features, such as wireless communication.

With continued reference to FIG. 3, in addition to controller 320 and communications subsystem 322, at least first terminal end 305a of electronic device 301 include input/output (I/O) subsystem 328, data storage subsystem 330, and memory subsystem 332. To enable management by controller 320, system interlink 334 communicatively connects controller 320 with communications subsystem 322, I/O subsystem 328, data storage subsystem 330, and memory subsystem 332. According to aspects of the present disclosure, controller 320 of electronic device 301 directs display driver(s) 336 to communicate, via visual data connection 338, user interface 340 including user interface controls 342 and display content 344 to flexible display 302. Controller 320 may receive, via I/O subsystem 328 and touch data connection 346, touch inputs 348 from user 310 that are detected by touch input layers 350a-350b of flexible display 302. Portable power supply 352 and battery 354 in either or both of first and second terminal ends 305a-305b facilitate operation of electronic device 301 both while being worn and not worn.

Memory subsystem 332 stores program code 368 such as display control application 370 that, when executed by controller 320, configures electronic device 301 to manage rendering and presenting display content 344 according to the full-length display area 103a, loop box display area 103c, and pivoted display area 103e based on positions of strap 306. Memory subsystem 332 stores program code 368 such as communication application 372 that, when executed by controller 320, configures electronic device 301 to communicate with communication device 324 and external node 326. Memory subsystem 332 stores computer data 374 such as user interface controls 342 and display content 344.

Memory subsystem 332 includes one or more computer readable storage devices that store program code 368 for execution by the processor subsystem to provide the functionality described herein. Program code 368 includes applications such as communication application 372 that generates or receives visual content for user interface 340. Program code 368 may be software or firmware that, when executed by controller 320, configures electronic device 301 to manage display configurations. Program code 368 may access, use, generate, modify, store, or communicate computer data 374.

FIG. 5A depicts a top three-dimensional view of example electronic device 301a that is an implementation of electronic device 301 (FIG. 3) configured to be laid flat, to pivot, and to coil rather than loop. Wrist-wearable strap 306a formed from first and second half straps 303a-303b includes support layers 304a-304b with respective middle portions 360a-360b having nonorthogonal transverse channels 562. Ribs 519 of nonorthogonal transverse channels 562 have a circular cross section that appears to be elliptical when viewed from the side. In one or more embodiments, the cross section may be other geometric shapes. In one or more embodiment, the size of the strap, nonorthogonal angle and direction of coiling may be different. Nonorthogonal transverse channels 562 guide bending movement of strap 306a from flat to a coil. In the flat, unpivoted position, first and second flexible displays 302-302b that form flexible display 302 provides full-length display area 103a. Strap 306a includes first and second half straps 303a-303b abutted together at lateral internal ends 309a-309b that are engaged on nonpivoting sides 412a-412b (right side) by latch 423.

Figure 5G:
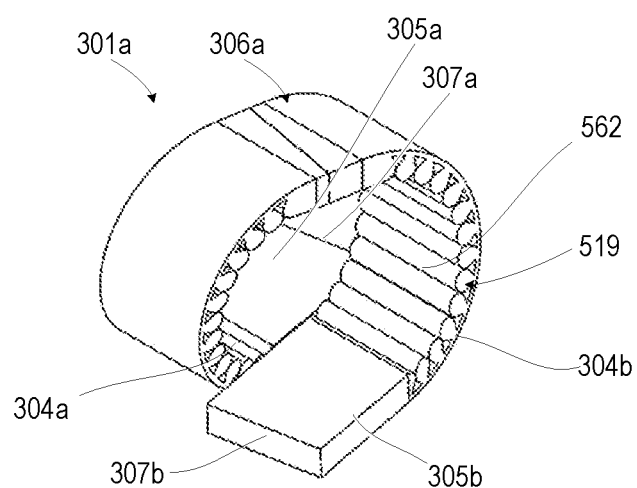
FIG. 5G depicts a three-dimensional view of the example electronic device of FIG. 4A in a coiled position, according to one or more embodiments.

FIG. 5B depicts a bottom three-dimensional view of electronic device 301a of FIG. 5A. First and second half straps 303a-303b are engaged on pivoting sides 401a-401b (left side) of first and second half straps 303a-303b of electronic device 301a by corner hinge 425 (FIG. 5F). With latch 423 released, first and second half straps 303a-303b are configurable in a corner pivoting movement about corner hinge 425 (FIG. 5F) that enables positioning first and second half straps 303a-303b to provide pivoted display area 103e (FIG. 4C). FIG. 5C depicts a top view of electronic device 301a with strap 306a formed from first and second half straps 303a-303b abutted together at lateral internal ends 309a-309b. In the flat, unpivoted position, first and second flexible displays 302-302b form flexible display 302 that provides full-length display area 103a. Lateral internal ends 309a-309b are engaged, respectively, on nonpivoting sides 412a-412b (right side) of first and second half straps 303a-303b by latch 423 (FIG. 5A). Lateral internal ends 309a-309b are engaged, respectively, on pivoting sides 401a-401b (left side) of first and second half straps 303a-303b by corner hinge 425 (FIG. 5F). FIG. 5D depicts a bottom view of support layers 304a-304b of electronic device 301a of FIG. 5A. FIG. 5E depicts nonpivoting sides 412a-412b (left side) of first and second half straps 303a-303b of electronic device 301a of FIG. 5A. Lateral internal ends 309a-309b of first and second half straps 303a-303b are coupled together by latch 423. FIG. 5F depicts pivoting sides 401a-401b (right side) of first and second half straps 303a-303b coupled by corner hinge 425 of electronic device 301a of FIG. 5A. Lateral internal ends 309a-309b of first and second half straps 303a-303b are coupled together by corner hinge 425. FIG. 5G depicts a three-dimensional view of electronic device 301a of FIG. 5A in a partially coiled position. First and second terminal ends 305a-305b are not fully aligned in juxtaposed adjacent position. Middle portions 360a-360b of inner support layers 304a-304b includes the series of nonorthogonal transverse channels 562 that are parallel to each other and that resist twisting while enabling at least one portion of strap 306a to coil in a plane not aligned with the longitudinal length dimension of strap 306a in the uncoiled position.

Figure 6G:
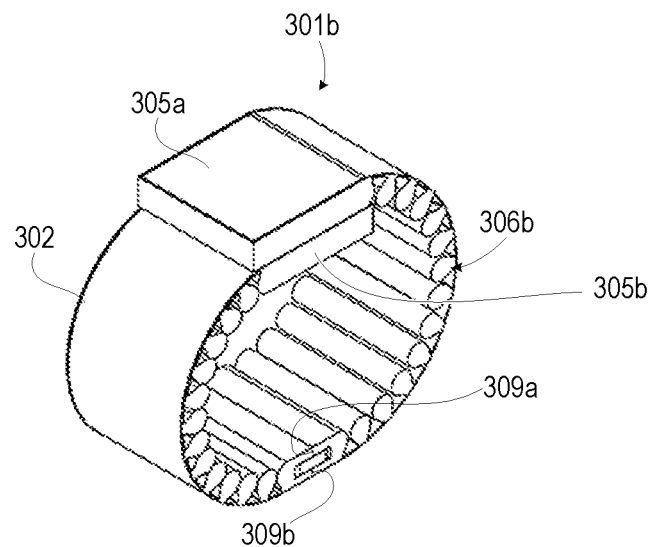
FIG. 6G depicts a three-dimensional view of the electronic device of FIG. 6A in a looped position, according to one or more embodiments.
Figure 6H:
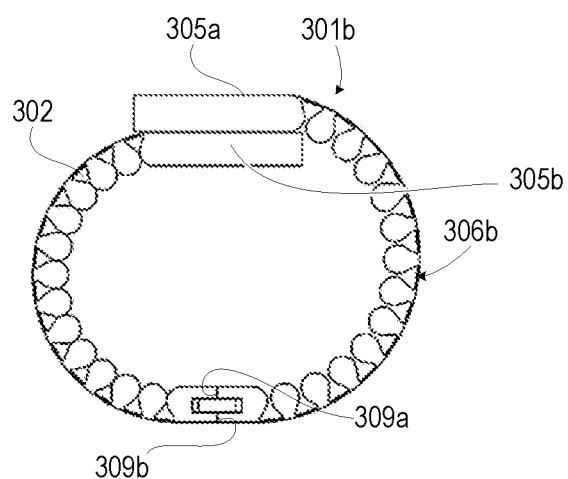
FIG. 6H depicts a right-side view of the electronic device of FIG. 6G in the looped position with overlapped terminal ends, according to one or more embodiments.

FIG. 6A depicts a top three-dimensional view of example electronic device 301b that is an implementation of electronic device 301 (FIG. 3) configured to be laid flat, to pivot, and to loop rather than coil. Wrist-wearable strap 306*b* includes support layers 304*a*-304*b* with respective middle portions 360*a*-360*b* each having orthogonal transverse channels 662. Ribs 619 of orthogonal transverse channels 662 have a circular drop cross section that guide bending movement of strap 306*b* from flat to a loop. In one or more embodiments, the cross section may be other geometric shapes. In the flat, unpivoted position, first and second flexible displays 302-302*b* that form flexible display 302 provides full-length display area 103*a*. Strap 306*a* includes first and second half straps 303*a*-303*b* abutted together at lateral internal ends 309*a*-309*b* that are engaged on nonpivoting sides 412*a*-412*b* (right side) by latch 423. FIG. 6B depicts a bottom three-dimensional view of electronic device 301*a* of FIG. 6A. First and second half straps 303*a*-303*b* are engaged on pivoting sides 401*a*-401*b* (left side) of first and second half straps 303*a*-303*b* of electronic device 301*a* by corner hinge 425. With latch 423 (FIG. 6A) released, first and second half straps 303*a*-303*b* are configurable in a corner pivoting movement about corner hinge 425 that enables positioning first and second half straps 303*a*-303*b* to provide pivoted display area 103*e* (FIG. 4C). FIG. 6C depicts a top view of electronic device 301*a* with strap 306*a* formed from first and second half straps 303*a*-303*b* abutted together at lateral internal ends 309*a*-309*b*. In the flat, unpivoted position, first and second flexible displays 302-302*b* form flexible display 302 that provides full-length display area 103*a*. Lateral internal ends 309*a*-309*b* are engaged, respectively, on nonpivoting sides 412*a*-412*b* (right side) of first and second half straps 303*a*-303*b* by latch 423 (FIG. 6A). Lateral internal ends 309*a*-309*b* are engaged, respectively, on pivoting sides 401*a*-401*b* (left side) of first and second half straps 303*a*-303*b* by corner hinge 425 (FIG. 6B). FIG. 6D depicts a bottom view of support layers 304*a*-304*b* of electronic device 301*a* of FIG. 6A. FIG. 6E depicts nonpivoting sides 412*a*-412*b* (left side) of first and second half straps 303*a*-303*b* of electronic device 301*a* of FIG. 6A. Lateral internal ends 309*a*-309*b* of first and second half straps 303*a*-303*b* are coupled together by latch 423. FIG. 6F depicts pivoting sides 401*a*-401*b* (right side) of first and second half straps 303*a*-303*b* of electronic device 301*a* of FIG. 5A. Lateral internal ends 309*a*-309*b* of first and second half straps 303*a*-303*b* are coupled together by corner hinge 425. FIG. 6G depicts a three-dimensional view of electronic device 301*b* of FIG. 6A in a looped position. First terminal end 305*a* overlaps second terminal end 305*b* and presents box display area 103*c*. FIG. 6H depicts a right side of the electronic device of FIG. 6A in the looped position.

FIG. 7A depicts a top three-dimensional view of electronic device 301*b* of FIG. 6A with first and second half straps 303*a*-303*b* of strap 306*b* pivoted to a juxtaposed parallel position to present pivoted display area 103*e* of one-half strap length by two strap width. Although having different nonorthogonal transverse channels 562, electronic device 301*a* (FIGS. 5A-5F) may similarly pivot to the juxtaposed parallel position as depicted for electronic device 301*b* (FIG. 7A). FIG. 7B depicts a bottom three-dimensional view of electronic device 301*b* of FIG. 7A in the full-length juxtaposed parallel position. FIG. 7C depicts a top view of the electronic device of FIG. 7A. FIG. 7D depicts a bottom view of electronic device 301*b* of FIG. 7A in the full-length juxtaposed parallel position. FIG. 7E depicts left side of electronic device 301*b* of FIG. 7A in the full-length juxtaposed parallel position. FIG. 7F depicts right side of electronic device 301*b* of FIG. 7A in the full-length juxtaposed parallel position.

Figure 8:
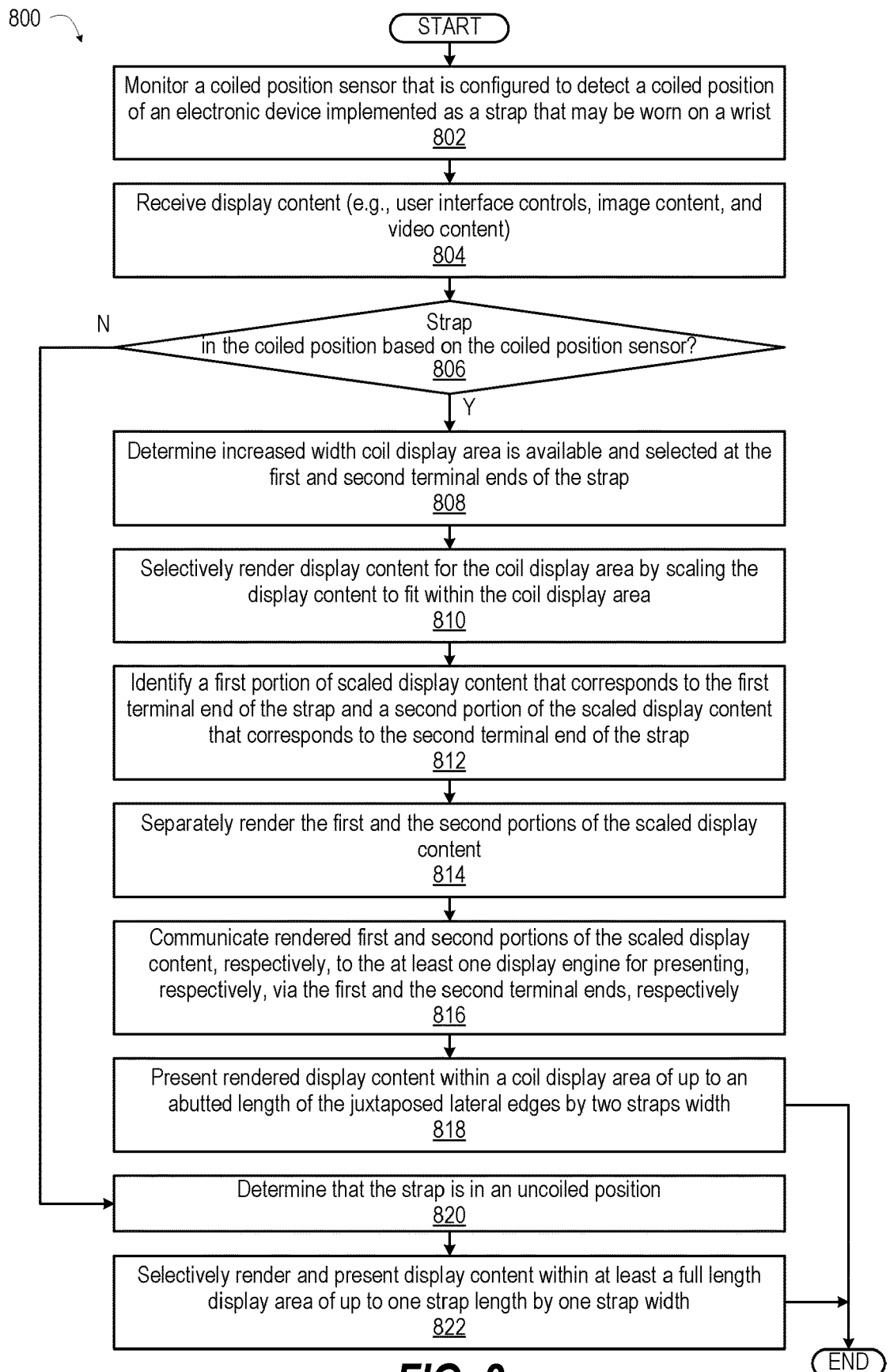
FIG. 8 is a flow diagram of a method of configuring a flexible display to render and present display content in an increased display width area when the flexible display is in the coiled position with juxtaposed terminal ends, according to one or more embodiments.
Figure 9:
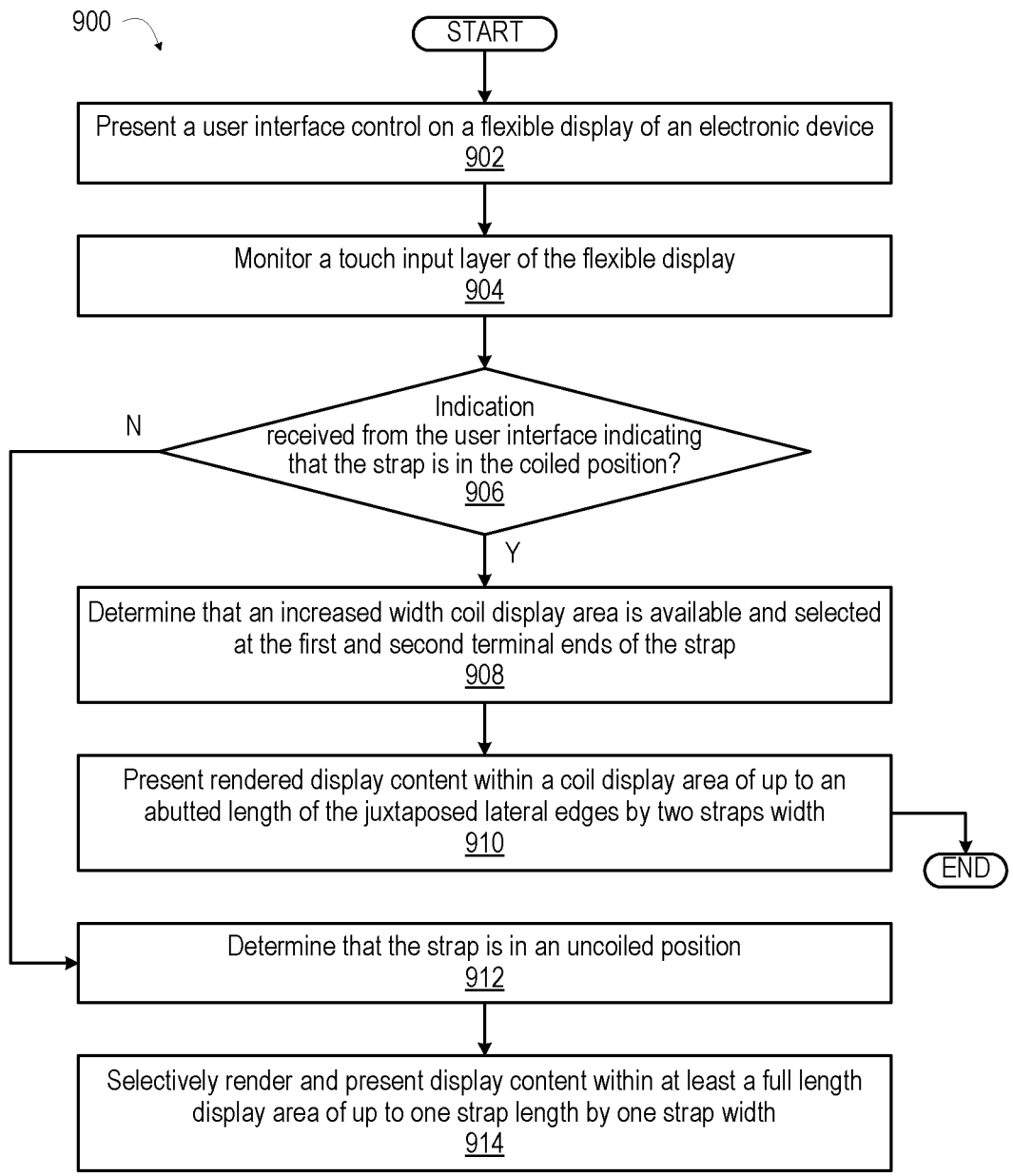
FIG. 9 is a flow diagram of a method that augments the method of FIG. 8 by facilitating user manual selection of a full-length display area or a coil display area, according to one or more embodiments.

FIG. 8 is a flow diagram of method 800 of configuring a flexible display to render and present display content in an increased display width area when the flexible display is in the coiled position with juxtaposed terminal end. FIG. 9 is a flow diagram of method 900 that augments the method of FIG. 8 by facilitating user manual selection of a full-length display area or a coil display area. The descriptions of method 800 (FIG. 8) and method 900 (FIG. 9) are provided with general reference to the specific components illustrated within the preceding FIGS. 1, 2A-2E, 3, 4A-4C, 5A-5G, 6A-6H, 7A-7F and especially embodiments configured to coil. Specific components referenced in method 800 (FIG. 8) and method 900 (FIG. 9) may be identical or similar to components of the same name used in describing preceding FIGS. 1, 2A-2E, 3, 4A-4C, 5A-5G, 6A-6H, 7A-7F. In one or more embodiments, controller 120 (FIG. 1) configures electronic device 101 (FIG. 1), electronic device 301 (FIG. 3), or electronic device 301*a* (FIG. 7A) to provide the described functionality of method 800 (FIG. 8) and method 900 (FIG. 9).

With reference to FIG. 8, method 800 includes method 800 includes monitoring a coiled position sensor that is configured to detect a coiled position of an electronic device implemented as a strap that may be worn on a wrist (block 802). Method 800 includes receiving display content (e.g., user interface controls, image content, and video content) (block 804). Method 800 includes determining whether the strap is in the coiled position based on the coiled position sensor (decision block 806). In response to determining that the strap is in the coiled position, method 800 includes determining that an increased width coil display area is available and selected at the first and second terminal ends of the strap (block 808). Method 800 includes selectively rendering display content for the coil display area by scaling the display content to fit within the coil display area (block 810). Method 800 includes identifying a first portion of scaled display content that corresponds to the first terminal end of the strap and a second portion of the scaled display content that corresponds to the second terminal end of the strap (block 812). Method 800 includes separately rendering the first and the second portions of the scaled display content (block 814). Method 800 includes communicating rendered first and second portions of the scaled display content, respectively, to the at least one display engine for presenting, respectively, via the first and the second terminal ends, respectively (block 816). Method 800 includes presenting rendered display content within a coil display area of up to an abutted length of the juxtaposed lateral edges by two straps width (block 818). Then method 800 ends. In response to determining that the strap is not in the coiled position in decision block 806, method 800 includes determining that the strap is in an uncoiled position (block 820). Method 800 includes selectively rendering and presenting display content within at least a full-length display area of up to one strap length by one strap width (block 822). Then method 800 ends.

In one or more embodiments, the strap is elongated in a longitudinal length dimension relative to a lateral width dimension and includes an outer layer presenting a flexible display and an inner support layer attached to an underside of the flexible display. The strap is configured to be positionable between an uncoiled position and the coiled position with lateral edges of first and second terminal ends of the strap juxtaposed in abutted alignment. In one or more embodiments, the coiled position sensor is stabilized in the coiled position by a coil retention mechanism that engages the juxtaposed lateral edges of first and second terminal ends of the strap while the strap is in the coiled position. In one or more embodiments, the coil retention mechanism includes at least one permanent magnet component positioned along a lateral edge of the first terminal end that juxtaposes the second terminal end while in the coiled position. The coiled retention mechanism includes at least one magnet target positioned along a corresponding lateral edge of the second terminal end that juxtaposes the first terminal end while in the coiled position. The at least one permanent magnet component and the at least one magnetic target are aligned to respectively attract while the first and the second straps are in juxtaposed alignment.

In one or more embodiments, the strap includes additional or alternative features to the retention mechanism that facilitate alignment and retention of the strap in the coiled position, enabling accurate sensing of the coiled position by the coiled position sensor. In an example, at least a middle portion of the inner support layer includes a series of nonorthogonal transverse channels that are parallel to each other and that resist twisting while enabling at least one portion of the strap to coil in a plane not aligned with the longitudinal length dimension of the strap in the uncoiled position. The plane of coiling of the strap enables juxtaposed abutting alignment between lateral edges of the first and the second terminal ends in the coiled position. When coiled, the strap may be worn on a wrist of a user.

With reference to FIG. 9, in one or more embodiments, method 900 includes presenting a user interface control on a flexible display of an electronic device (block 902). Method 900 includes monitoring a touch input layer of the flexible display (block 904). Method 900 includes determining whether an indication is received from the user interface indicating that the strap is in the coiled position (decision block 906). In response to receiving an indication via the flexible display that the strap is in the coiled position, method 900 includes determining that an increased width coil display area is available and selected at the first and second terminal ends of the strap (block 908). Method 900 includes presenting rendered display content within a coil display area of up to an abutted length of the juxtaposed lateral edges by two straps width (block 910). Then method 900 ends. In response to not receiving an indication via the flexible display that the strap is in the coiled position in decision block 906, method 900 includes determining that the strap is in an uncoiled position (block 912). Method 900 includes selectively rendering and presenting display content within at least a full-length display area of up to one strap length by one strap width (block 914). Then method 900 ends.

Figure 10A:
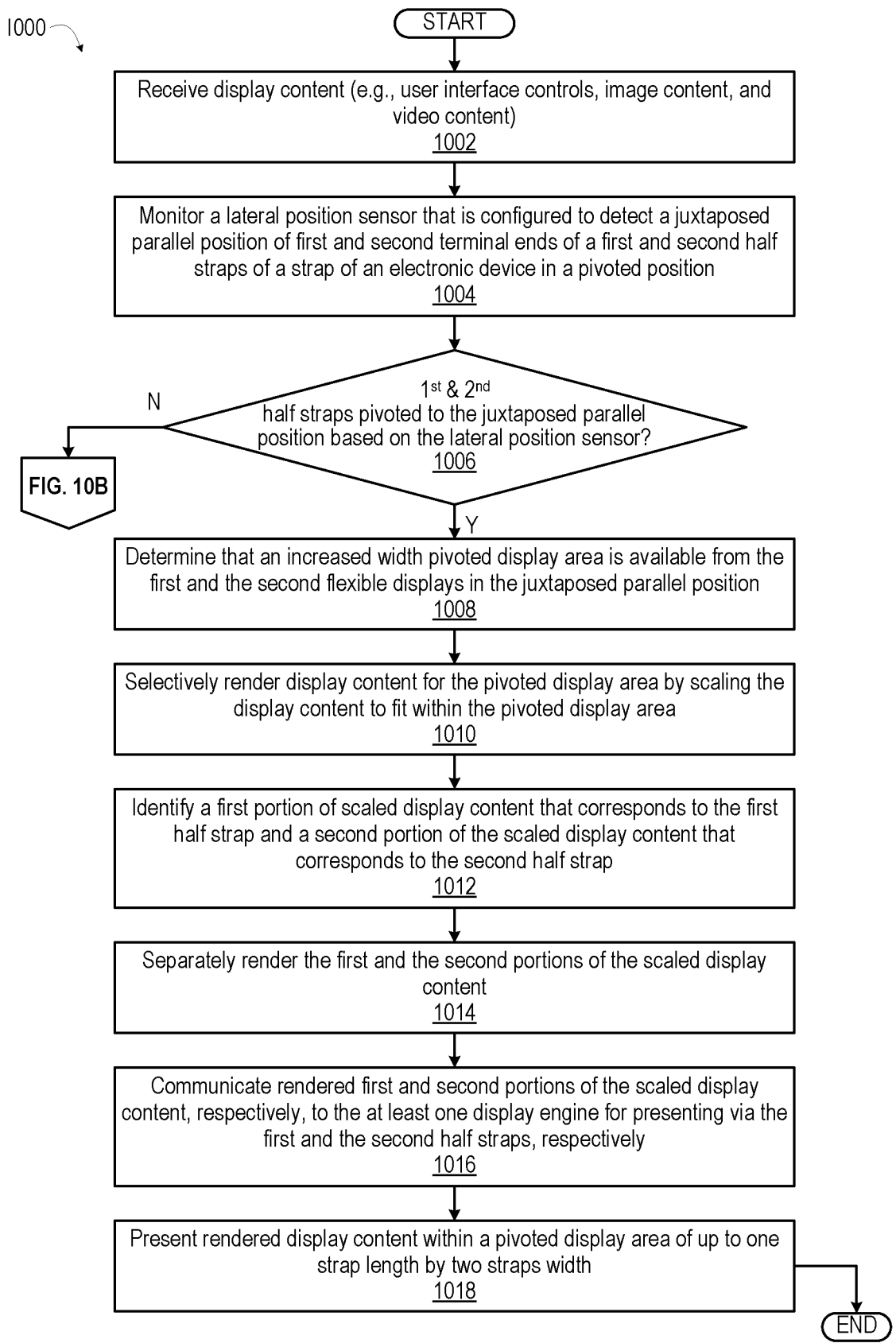
FIGS. 10A-10B (collectively "FIG. 10") are a flow diagram presenting a method of configuring a flexible display when not being worn from the full-length display area to a pivoted display area, according to one or more embodiments.
Figure 10B:
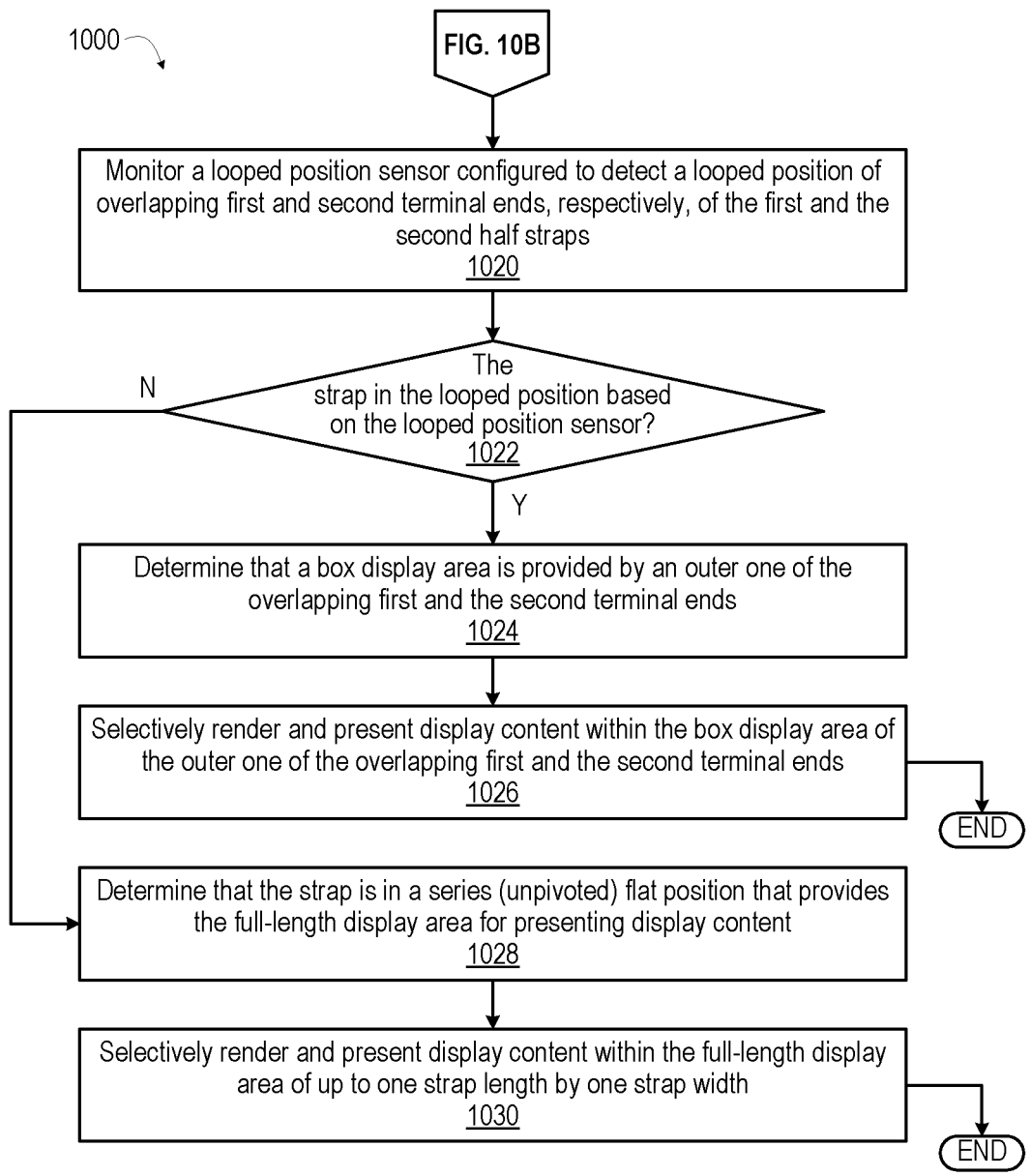
Figure 11:
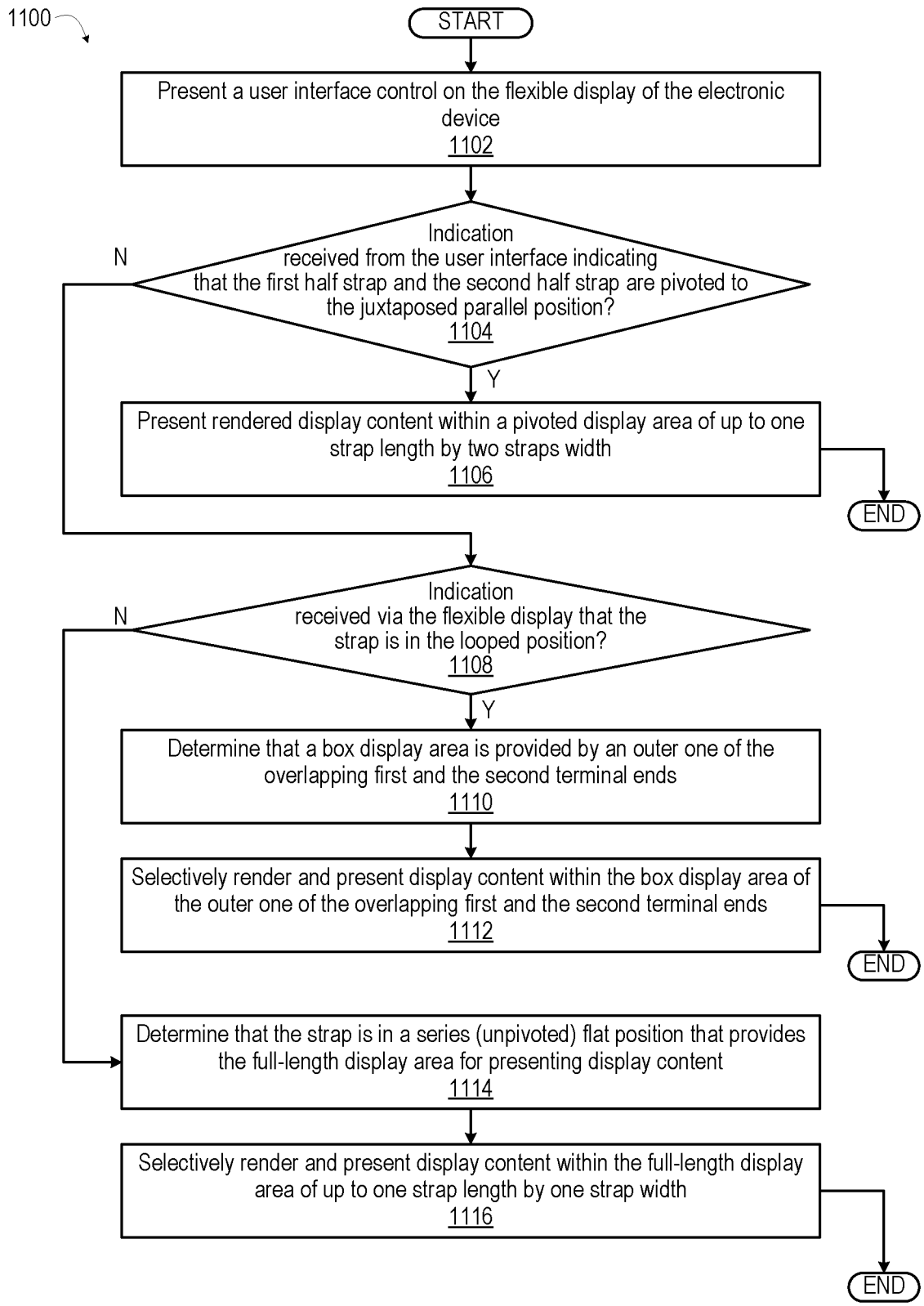
FIG. 11 is a flow diagram presenting a method that augments the method of FIG. 10 by facilitating user manual selection of a full-length display area or pivoted display area, according to one or more embodiments.

FIGS. 10A-10B (collectively "FIG. 10") are a flow diagram presenting a method of configuring a flexible display when not being worn from the full-length display area to a pivoted display area. FIG. 11 is a flow diagram presenting a method that augments the method of FIG. 10 by facilitating user manual selection of a full-length display area or pivoted display area. The descriptions of method 1000 (FIG. 10) and method 1100 (FIG. 11) are provided with general reference to the specific components illustrated within the preceding FIGS. 1, 3, 4A-4C, 5A-5G, 6A-6H, 7A-7F. Specific components referenced in method 1000 (FIG. 10) and method 1100 (FIG. 11) may be identical or similar to components of the same name used in describing preceding FIGS. 1, 3, 4A-4C, 5A-5G, 6A-6H, 7A-7F. In one or more embodiments, controller 120 (FIG. 1) configures electronic device 101 (FIG. 1) or electronic device 301 (FIG. 3) to provide the described functionality of method 1000 (FIG. 10) and method 1100 (FIG. 11).

With reference to FIG. 10A, in one or more embodiments, method 1000 includes receiving display content (e.g., user interface controls, image content, and video content) (block 1002). Method 1000 includes monitoring a lateral position sensor that is configured to detect a juxtaposed parallel position of first and second terminal ends of a first and second half straps of a strap of an electronic device in a pivoted position (block 1004). With reference to FIG. 11, method 1100 includes presenting a user interface control on the flexible display of the electronic device (block 1102). Method 1100 includes determining whether an indication is received from the user interface indicating that the first half strap and the second half strap are pivoted to the juxtaposed parallel position (i.e., not in the serial flat or looped position) (decision block 1104). In response to receiving an indication via the flexible display that the strap is in the juxtaposed parallel position, method 1100 includes presenting rendered display content within a pivoted display area of up to one strap length by two straps width (block 1106). Then method 1100 ends. In response to not receiving an indication via the flexible display that the strap is in the juxtaposed parallel position in decision block 1104, method 1100 includes determining whether an indication is received via the flexible display that the strap is in the looped position (decision block 1108). In response to determining that the strap is in the looped position based on receiving the indication, method 1100 includes determining that a box display area is provided by an outer one of the overlapping first and the second terminal ends (block 1110). Method 1100 includes selectively rendering and presenting display content within the box display area of the outer one of the overlapping first and the second terminal ends (block 1112). Then method 1100 ends. In response to determining that an indication is not received via the flexible display that the strap is in the looped position in decision block 1108, method 1100 includes determining that the strap is in a series (unpivoted) flat position that provides the full-length display area for presenting display content (block 1114). Method 1100 includes selectively rendering and presenting display content within the full-length display area of up to one strap length by one strap width (block 1116). Then method 1100 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a strap elongated in a longitudinal length dimension relative to a lateral width dimension and comprising an outer layer presenting a flexible display and an inner support layer attached to an underside of the flexible display, wherein at least a middle portion of the inner support layer includes a series of nonorthogonal transverse channels that are parallel to each other and that resist twisting while enabling at least one portion of the strap to coil in a plane not aligned with the longitudinal length dimension of the strap in the uncoiled position, the strap configured to be positionable between an uncoiled position and a coiled position with lateral edges of first and second terminal ends of the strap juxtaposed in abutted alignment; and
   at least one display engine communicatively coupled to the flexible display and configured to:
     in response to determining the coiled position of the strap with juxtaposed lateral edges of the first and the second terminal ends, selectively render and present display content within a coil display area of an abutted length of the juxtaposed lateral edges by two straps width.

2. The electronic device of claim 1, wherein, in response to determining an uncoiled position of the strap, the at least one display engine selectively renders and presents display content within a full-length display area of up to one strap length by one strap width.

3. The electronic device of claim 1, further comprising a coil retention mechanism that engages the juxtaposed lateral edges of first and second terminal ends of the strap while the strap is in the coiled position.

4. The electronic device of claim 3, wherein the coil retention mechanism comprises:
   at least one permanent magnet component positioned along a lateral edge of the first terminal end that juxtaposes the second terminal end while in the coiled position; and
   at least one magnet target positioned along a corresponding lateral edge of the second terminal end that juxtaposes the first terminal end while in the coiled position, wherein the at least one permanent magnet component and the at least one magnetic target are aligned to respectively attract while the first and the second terminal ends of the strap are in juxtaposed alignment.

5. The electronic device of claim 1, further comprising a coiled position sensor communicatively coupled to the at least one display engine, and wherein the at least one display engine is further configured to determine the coiled position of the strap based on the coiled position sensor.

6. The electronic device of claim 1, further comprising a user interface control communicatively coupled to the at least one display engine and configured to receive an input indicating selection of the coil display area for presentation, and wherein the at least one display engine determines that the strap is in the coiled position based on the selection of the user interface control.

7. The electronic device of claim 1, wherein the plane of coiling of the strap enabling juxtaposed abutting alignment between the first and the second terminal ends in the coiled position, which is configured to be worn on a wrist of a user.

8. The electronic device of claim 1, wherein, in response to determining that the strap is in the coiled position, the at least one display engine:
   scales the display content to fit within the coil display area;
   identifies a first portion of scaled display content that corresponds to the first terminal end of the strap and a second portion of the scaled display content that corresponds to the second terminal end of the strap;
   separately renders the first and the second portions of the scaled display content; and
   communicates rendered first and second portions of the scaled display content, respectively, to the at least one display engine for presenting respectively via the first and the second terminal ends, respectively.

9. A method comprising:
   monitoring one of a coiled position sensor and a user interface control for indication that a strap is in a coiled position, the strap elongated in a longitudinal length dimension relative to a lateral width dimension and comprising an outer layer presenting a flexible display and an inner support layer attached to an underside of the flexible display, wherein at least a middle portion of the inner support layer includes a series of nonorthogonal transverse channels that are parallel to each other and that resist twisting while enabling at least one portion of the strap to coil in a plane not aligned with the longitudinal length dimension of the strap in the uncoiled position, the strap configured to be positionable between an uncoiled position and the coiled position with lateral edges of first and second terminal ends of the strap juxtaposed in abutted alignment; and in response to determining the coiled position of the strap with juxtaposed lateral edges of the first and the second terminal ends based on the one of the coiled position sensor and the user interface control:
selectively rendering display content; and
presenting rendered display content within a coil display area of an abutted length of the juxtaposed lateral edges by two straps width.

10. The method of claim 9, further comprising, in response to uncoiled position of the strap, selectively rendering and presenting display content within a full-length display area of up to one strap length by one strap width.

11. The method of claim 9, further comprising:
monitoring the coiled position sensor; and
determining the coiled position of the strap based on the coiled position sensor.

12. The method of claim 11, further comprising monitoring the coiled position sensor that is stabilized in the coiled position by a coil retention mechanism that engages the juxtaposed lateral edges of first and second terminal ends of the strap while the strap is in the coiled position.

13. The method of claim 12, wherein the coil retention mechanism comprises:
at least one permanent magnet component positioned along a lateral edge of the first terminal end that juxtaposes the second terminal end while in the coiled position; and
at least one magnet target positioned along a corresponding lateral edge of the second terminal end that juxtaposes the first terminal end while in the coiled position, wherein the at least one permanent magnet component and the at least one magnetic target are aligned to respectively attract while the first and the second terminal ends of the strap are in juxtaposed alignment.

14. The method of claim 9, further comprising:
monitoring the user interface control;
receiving an input indicating selection of the coil display area for presentation; and
determining that the strap is in the coiled position based on the selection of the user interface control.

15. The method of claim 9, wherein the plane of coiling of the strap enabling juxtaposed abutting alignment between the first and the second terminal ends in the coiled position, which is configured to be worn on a wrist of a user.

16. The method of claim 9, further comprising, in response to determining that the strap is in the coiled position:
scaling the display content to fit within the coil display area;
identifying a first portion of scaled display content that corresponds to the first terminal end of the strap and a second portion of the scaled display content that corresponds to the second terminal end of the strap;
separately rendering the first and the second portions of the scaled display content; and
communicating rendered first and second portions of the scaled display content to at least one display engine for presenting respectively via the first and the second terminal ends, respectively.

17. A computer program product comprising:
a non-transitory computer readable storage device; and
program code on the non-transitory computer readable storage device that when executed by a processor associated with an electronic device, the program code enables the electronic device to provide functionality of:
monitoring one of a coiled position sensor and a user interface control for indication that a strap is in a coiled position, the strap elongated in a longitudinal length dimension relative to a lateral width dimension and comprising an outer layer presenting a flexible display and an inner support layer attached to an underside of the flexible display, wherein at least a middle portion of the inner support layer includes a series of nonorthogonal transverse channels that are parallel to each other and that resist twisting while enabling at least one portion of the strap to coil in a plane not aligned with the longitudinal length dimension of the strap in the uncoiled position, the strap configured to be positionable between an uncoiled position and the coiled position with lateral edges of first and second terminal ends of the strap juxtaposed in abutted alignment; and
in response to determining the coiled position of the strap with juxtaposed lateral edges of the first and the second terminal ends based on the one of the coiled position sensor and the user interface control:
selectively rendering display content; and
presenting rendered display content within a coil display area of an abutted length of the juxtaposed lateral edges by two straps width.

18. The computer program product of claim 17, wherein the program code enables the electronic device to provide functionality of, in response to uncoiled position of the strap, selectively rendering and presenting display content within a full-length display area of up to one strap length by one strap width.

19. The computer program product of claim 17, wherein the program code enables the electronic device to provide functionality of:
monitoring the coiled position sensor; and
determining the coiled position of the strap based on the coiled position sensor.

20. The computer program product of claim 17, wherein the program code enables the electronic device to provide functionality of monitoring the coiled position sensor that is stabilized in the coiled position by a coil retention mechanism that engages the juxtaposed lateral edges of first and second terminal ends of the strap while the strap is in the coiled position.

* * * * *